United States Patent
Kishino et al.

(10) Patent No.: US 10,907,395 B2
(45) Date of Patent: Feb. 2, 2021

(54) OPENING-CLOSING BODY CONTROL DEVICE

(71) Applicant: Mitsuba Corporation, Gunma (JP)

(72) Inventors: Ryosuke Kishino, Kiryu (JP); Takayuki Ikeda, Kiryu (JP); Masahiro Fueki, Kiryu (JP); Takashi Kimura, Kiryu (JP); Ikuharu Yokozawa, Kiryu (JP)

(73) Assignee: Mitsuba Corporation, Gunma (JP)

( * ) Notice: Subject to any disclaimer, the term of this patent is extended or adjusted under 35 U.S.C. 154(b) by 91 days.

(21) Appl. No.: 16/336,725

(22) PCT Filed: Oct. 3, 2017

(86) PCT No.: PCT/JP2017/035954
§ 371 (c)(1),
(2) Date: Mar. 26, 2019

(87) PCT Pub. No.: WO2018/066550
PCT Pub. Date: Apr. 12, 2018

(65) Prior Publication Data
US 2019/0226263 A1 Jul. 25, 2019

(30) Foreign Application Priority Data

Oct. 6, 2016 (JP) ................. 2016-198224

(51) Int. Cl.
*E05F 15/611* (2015.01)
*H02P 7/29* (2016.01)
*B60J 5/10* (2006.01)

(52) U.S. Cl.
CPC ............. *E05F 15/611* (2015.01); *B60J 5/10* (2013.01); *H02P 7/29* (2013.01)

(58) Field of Classification Search
None
See application file for complete search history.

(56) References Cited

U.S. PATENT DOCUMENTS

| 2012/0013143 | A1* | 1/2012 | Schiegel | ................. | E05F 15/40 |
| | | | | | 296/146.4 |
| 2015/0123637 | A1* | 5/2015 | Iwamizu | .......... | H03K 17/08104 |
| | | | | | 323/283 |

(Continued)

FOREIGN PATENT DOCUMENTS

| JP | 2003232167 A | 8/2003 |
| JP | 2014531885 A | 11/2014 |

(Continued)

OTHER PUBLICATIONS

PCT Office, International Search Report issued in PCT/JP2017/035954 dated Dec. 19, 2017, 4 pages.

*Primary Examiner* — Lori L Lyjak
(74) *Attorney, Agent, or Firm* — Wood Herron & Evans LLP

(57) ABSTRACT

An opening-closing body control device is provided, including a switch unit provided between a power supply device and a drive source, a control unit configured to electrically connect or cut off the connection between the power supply device and the drive source by controlling a conductive state or a cut-off state of the switch unit, a voltage restriction unit configured to restrict a generated voltage of the drive source generated when the drive source is rotated by an external force to a predetermined voltage in a case in which the connection between the power supply device and the drive source is cut off, and a current detection unit configured to detect a generated current output from the drive source when the generated voltage is restricted to the predetermined voltage, wherein the control unit electrically connects the power supply device to the drive source by controlling the switch unit to be in the conductive state in response to the generated current being detected.

5 Claims, 14 Drawing Sheets

(56) References Cited

U.S. PATENT DOCUMENTS

| | | | | |
|---|---|---|---|---|
| 2015/0207437 A1* | 7/2015 | Nagler | ............... | H02P 3/14 |
| | | | | 318/139 |
| 2016/0315570 A1* | 10/2016 | Hayashi | ............... | H02P 7/29 |
| 2017/0085208 A1* | 3/2017 | Yamamoto | ............ | E05F 15/659 |
| 2017/0214345 A1* | 7/2017 | Tanizawa | ............... | H02P 7/29 |

FOREIGN PATENT DOCUMENTS

| | | |
|---|---|---|
| JP | 2017057645 A | 3/2017 |
| WO | 2010083999 A1 | 7/2010 |

* cited by examiner

OPENING-CLOSING BODY CONTROL DEVICE

The present invention relates to an opening-closing body control device. Priority is claimed on Japanese Patent Application No. 2016-198224 filed on Oct. 6, 2016, the contents of which are incorporated herein by reference.

TECHNICAL FIELD

Background

Conventionally, an opening-closing body control device for driving a tailgate to open and close using power of a motor is provided on an automobile. Such an opening-closing body control device includes a motorized mode in which the tailgate is electrically opened and closed by power of a motor, and a manual mode in which the tailgate can be manually opened and closed.

When a motor is rotated by an external force, the motor generally operates as a generator and an induced voltage is generated. Therefore, when a tailgate is manually operated by a user in the manual mode, there are cases in which a generated voltage arises in the motor, and thereby, an overvoltage is generated inside the opening-closing body control device. Thus, Patent Document 1 discloses a method of reducing a voltage inside the opening-closing body control device to a battery voltage by turning on (electrical continuity) a reverse connection protection relay when non-motorized movement of a tailgate is detected.

RELATED ART DOCUMENTS

Patent Documents

[Patent Document 1]
Published Japanese Translation No. 2014-531885 of the PCT International Publication

SUMMARY OF INVENTION

Problems to be Solved by the Invention

However, in the method disclosed in Patent Document 1, since a time delay occurs before the reverse connection protection relay is turned on after the non-motorized movement of the tailgate is detected, an overvoltage during that time cannot be coped with. As a result, there are cases in which internal components of the opening-closing body control device may fail due to the overvoltage. Such a problem is not limited to a tailgate and is a common problem with opening-closing bodies provided on vehicles.

The present invention has been made in view of such circumstances, and an objective of the present invention is to provide an opening-closing body control device in which an overvoltage generated due to non-motorized movement of an opening-closing body can be prevented.

Means for Solving the Problem

One aspect of the present invention provides an opening-closing body control device configured to drive an opening-closing body by supplying power from a power supply device to a drive source of the opening-closing body which opens and closes an opening of a vehicle, the opening-closing body control device including a switch unit provided between the power supply device and the drive source, a control unit configured to electrically connect or cut off the connection between the power supply device and the drive source by controlling a conductive state or a cut-off state of the switch unit, a voltage restriction unit configured to restrict a generated voltage of the drive source generated when the drive source is rotated by an external force to a predetermined voltage in a case in which the connection between the power supply device and the drive source is cut off, and a current detection unit configured to detect a generated current output from the drive source when the generated voltage is restricted to the predetermined voltage, wherein the control unit electrically connects the power supply device to the drive source by controlling the switch unit to be in the conductive state in response to the generated current being detected.

One aspect of the present invention is the above-described opening-closing body control device, wherein the control unit cuts off the electrical connection between the power supply device and the drive source by controlling the switch unit to be in the cut-off state when a rotation number of the drive source is lower than a predetermined rotation number.

One aspect of the present invention is the above-described opening-closing body control device, wherein the control unit controls the switch unit to be in the conductive state when the generated current is detected.

One aspect of the present invention is the above-described opening-closing body control device, wherein the control unit controls the switch unit to be in the conductive state when the generated current equal to or higher than a predetermined current value continues to be detected for a predetermined period of time.

One aspect of the present invention is the above-described opening-closing body control device, wherein the control unit controls the switch unit to be in the conductive state when an integrated value of the generated current detected by the current detection unit is equal to or higher than a predetermined value after the generated voltage is restricted to the predetermined voltage.

One aspect of the present invention provides an opening-closing body control device configured to drive an opening-closing body by supplying power from a power supply device to a drive source of the opening-closing body which opens and closes an opening of a vehicle, the opening-closing body control device including a switch unit provided between the power supply device and the drive source, a control unit configured to electrically connect or cut off the connection between the power supply device and the drive source by controlling a conductive state or a cut-off state of the switch unit, a voltage restriction unit configured to restrict a generated voltage of the drive source generated when the drive source is rotated by an external force to a predetermined voltage in a case in which the connection between the power supply device and the drive source is cut off, and a voltage detection unit configured to detect the generated voltage, wherein the control unit electrically connects the power supply device to the drive source by controlling the switch unit to be in the conductive state in accordance with the generated voltage detected by the voltage detection unit.

One aspect of the present invention is the above-described opening-closing body control device further including a plurality of switching elements, and an inverter configured to convert a direct current (DC) voltage supplied from the power supply device into an alternating current (AC) voltage and apply the AC voltage to the drive source, wherein the control unit controls the switching element having a freewheeling diode through which a generated current of the drive source flows among the plurality of switching elements to be in an ON state when a rotation number of the drive source is not lower than a predetermined rotation number after controlling the switch unit to be in the conductive state.

Advantage of the Invention

As described above, according to the present invention, an overvoltage generated due to non-motorized movement of the opening-closing body can be prevented.

DESCRIPTION OF THE EMBODIMENTS

Figure 1:
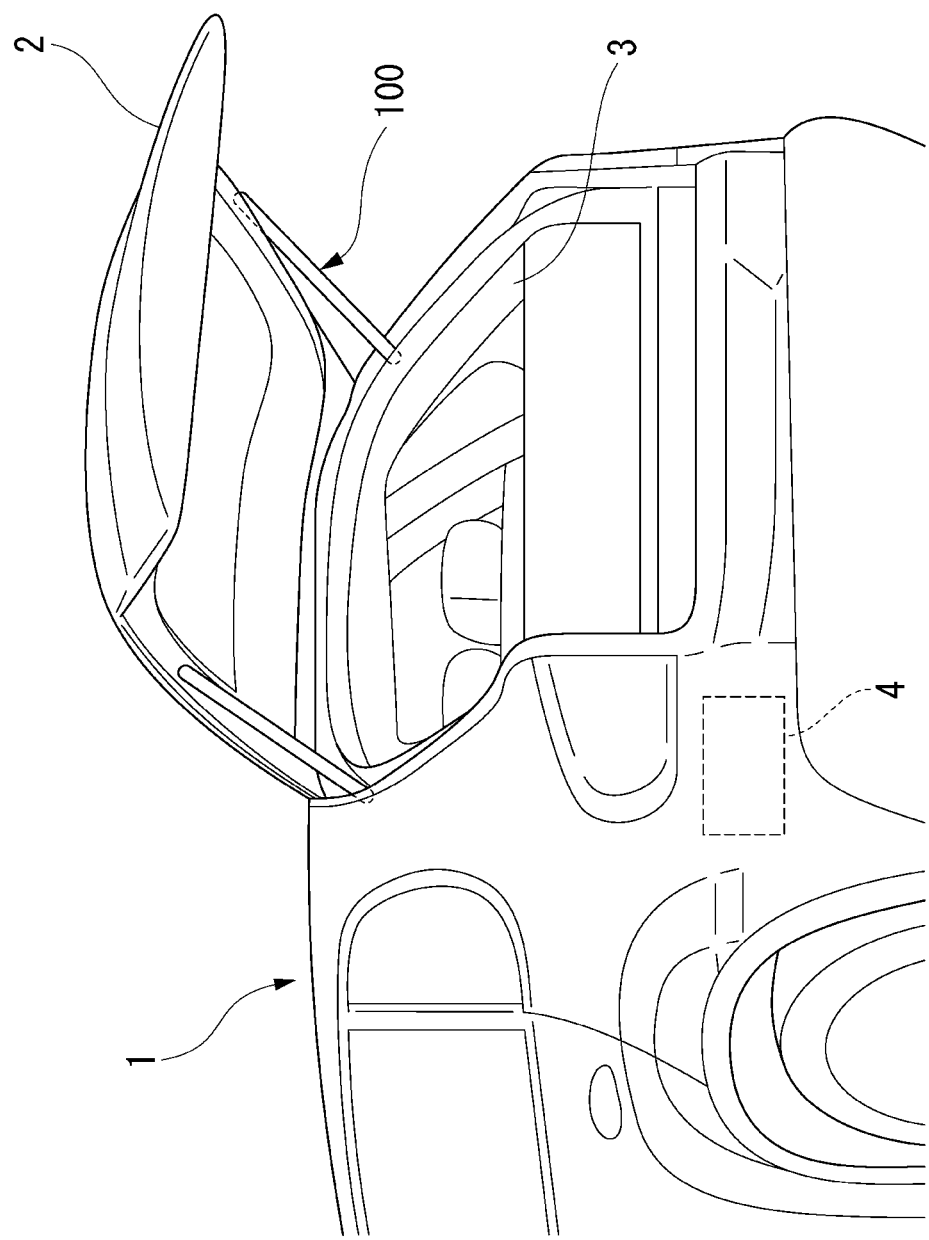
FIG. 1 is a perspective view illustrating an example of a vehicle 1 in which an opening-closing body control device 4 according to a first embodiment is mounted.

Hereinafter, the present invention will be described through embodiments of the present invention, but the scope of the present invention is not limited to the following embodiments. In addition, all of the combinations of features described in the embodiments are not necessarily essential to solutions of the invention. In the drawings, the same or similar parts are denoted by the same reference signs and duplicate descriptions thereof may be omitted.

Hereinafter, an opening-closing body control device according to the present embodiment will be described with reference to the drawings. Further, in the present embodiment, a case in which the opening-closing body provided in a vehicle is a tailgate of the vehicle will be described, but the present invention is not limited thereto, and the opening-closing body may be a sliding door, for example.

First Embodiment

Figure 2:
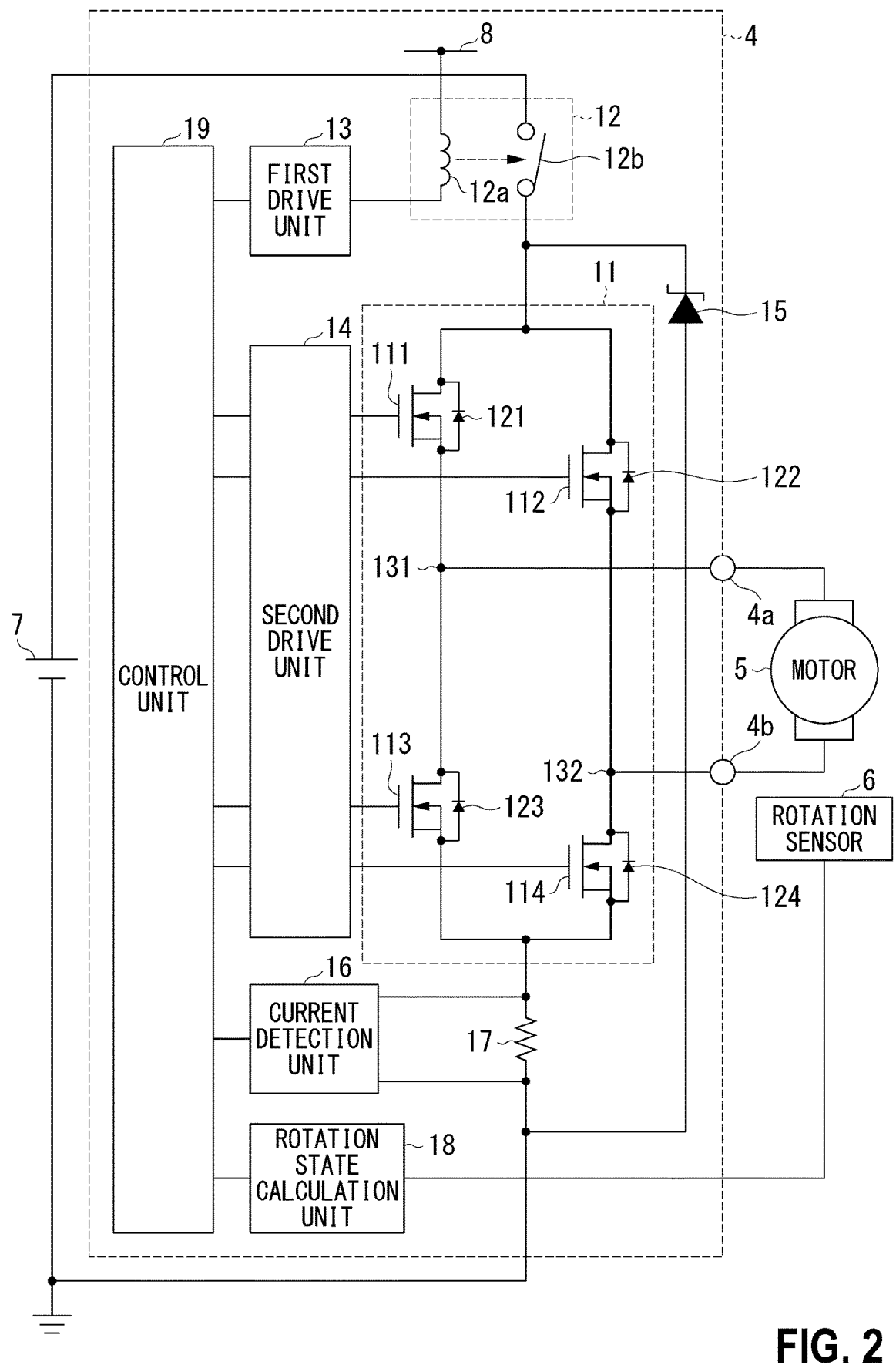
FIG. 2 is a diagram illustrating an example of a schematic configuration of the opening-closing body control device 4 according to the first embodiment.

FIG. 1 is a perspective view illustrating an example of a vehicle 1 in which an opening-closing body control device 4 according to a first embodiment is mounted. FIG. 2 is a diagram illustrating an example of a schematic configuration of the opening-closing body control device 4 according to the first embodiment.

As illustrated in FIG. 1, an actuator 100 is provided in the vehicle 1, and this actuator is driven by the opening-closing body control device 4 according to the first embodiment, for example, to open and close a tailgate 2 of the vehicle 1. The tailgate 2 is provided to be openable and closable with respect to an opening 3 formed in a vehicle rear portion of the vehicle 1 via a hinge mechanism (not illustrated) formed at an upper portion 3a of the opening 3.

The actuator 100 is provided between a periphery of the opening 3 on a vehicle body side and the tailgate 2 provided to be able to open and close the opening 3. The actuator 100 performs an opening and closing operation of the tailgate 2 by being extended and contracted in an axial direction due to driving of a motor 5 (drive source) provided in the actuator 100. Therefore, the opening-closing body control device 4 controls the opening and closing of the tailgate 2 by rotationally driving the motor 5. For example, the actuator 100 is provided on both the left and right sides of the opening 3.

One end of the motor 5 is connected to a first output terminal 4a of the opening-closing body control device 4 and the other end thereof is connected to a second output terminal 4b.

As illustrated in FIG. 2, a rotation sensor 6 detects rotation of the motor 5. For example, the rotation sensor 6 is a magnetic rotary encoder including a Hall integrated circuit (IC). For example, the rotation sensor 6 detects a change in magnetic flux density received from a sensor magnet (not illustrated) provided in the motor 5. The rotation sensor 6 uses a detected change in the magnetic flux density as an electric signal and generates two-phase (A-phase and B-phase) detection signals whose phases are different from each other. Then, in the rotation sensor 6, a value of an alternating signal of each phase is converted into a binary digital signal (pulse signal) in which an output value thereof is changed to High and Low depending on whether or not the value of an alternating signal of each phase exceeds a preset value (that is, whether or not an intensity of a magnetic field received by the rotation sensor 6 exceeds a predetermined intensity). The rotation sensor 6 outputs the A-phase pulse signal and the B-phase pulse signal as pulse signals of the respective phases to the opening-closing body control device 4 as detection signals.

Hereinafter, the opening-closing body control device 4 according to the first embodiment will be described in more detail.

As illustrated in FIG. 2, the opening-closing body control device 4 includes an inverter 11, a switch unit 12, a first drive unit 13, a second drive unit 14, a voltage restriction unit 15, a current detection unit 16, a shunt resistor 17, a rotation state calculation unit 18, and a control unit 19.

The inverter 11 converts a direct current (DC) voltage supplied from a power supply device 7 into an alternating current (AC) voltage and applies the AC voltage to the motor 5. For example, the inverter 11 includes four switching elements 111 to 114. On the basis of a first drive signal and a second drive signal supplied from the second drive unit 14, the inverter 11 switches between a conductive state and a cut-off state of each of the switching elements 111 to 114 to control a rotation number and torque of the motor 5. Here, for example, the power supply device 7 is a battery.

The inverter 11 includes upper switching elements 111 and 112 and lower switching elements 113 and 114. In the first embodiment, the inverter 11 is configured with the upper switching elements 111 and 112 and the lower switching elements 113 and 114 arranged in an H-bridge connection. Specifically, the switching elements 111 and 113 connected in series and the switching elements 112 and 114 connected in series are connected in parallel between a high potential side of the power supply device 7 and a ground potential. Also, one end of a power supply terminal of the motor 5 is connected to a connection point 131 between the switching element 111 and the switching element 113 via the first output terminal 4a. The other end of the power supply terminal of the motor 5 is connected to a connection point 132 between the switching element 112 and the switching element 114 via the second output terminal 4b. For example, the switching elements 111 to 114 are field-effective transistors (FETs) or insulated gate bipolar transistors (IGBTs). The shunt resistor 17 is provided between the inverter 11 and the ground.

Also, the switching elements 111 to 114 are each connected in parallel to freewheeling diodes 121 to 124. Specifically, the switching element 111 is connected in parallel to the freewheeling diode 121. The switching element 112 is connected in parallel to the freewheeling diode 122. The switching element 113 is connected in parallel to the freewheeling diode 123. The switching element 114 is connected in parallel to the freewheeling diode 124.

The switch unit 12 is provided between the power supply device 7 and the motor 5. Specifically, the switch unit 12 is provided between the power supply device 7 and the inverter 11 connected to the motor 5. For example, the switch unit 12 is a so-called relay that performs opening and closing of the switch 12b according to an input signal input to a coil 12a. In the first embodiment, one end of the coil 12a is connected to a driving power supply 8 and the other end thereof is connected to the first drive unit 13. One end of the switch 12b is connected to an output of the power supply device 7, and the other end thereof is connected to a drain terminal of the switching element 111 and the voltage restriction unit 15.

The first drive unit 13 electrically connects or cuts off the connection between the power supply device 7 and the motor 5 by controlling a conductive state or a cut-off state of the switch unit 12. Specifically, when a conductive state transition signal indicating that the switch unit 12 is brought into a conductive state is acquired from the control unit 19, the first drive unit 13 causes a current (input signal) to flow from the driving power supply 8 to the switch unit 12 by connecting the other end of the coil 12a to the ground. Thereby, the switch unit 12 is brought into a conductive state. Therefore, the power supply device 7 and the inverter 11 are electrically connected. Here, the inverter 11 and the motor 5 are electrically connected. Accordingly, when the switch unit 12 is in a conductive state, the power supply device 7 and the motor 5 are electrically connected.

On the other hand, when a cut-off state transition signal indicating that the switch unit 12 is brought into a cut-off state is acquired from the control unit 19, the first drive unit 13 releases the connection between the other end of the coil 12a and the ground. Thus, since no current flows from the driving power supply 8 to the switch unit 12, the switch unit 12 is in a cut-off state. As a result, the electrical connection between the power supply device 7 and the inverter 11 is released. That is, when the switch unit 12 is brought into a cut-off state, the electrical connection between the power supply device 7 and the motor 5 is released.

Here, in a case of a motorized mode in which the tailgate 2 is electrically opened and closed by the motor 5, the opening-closing body control device 4 normally causes the switch unit 12 to be in a conductive state. Further, in a case of a manual mode in which the tailgate 2 is manually openable and closable, the opening-closing body control device 4 causes the switch unit 12 to be in a cut-off state.

When the connection between the power supply device 7 and the motor 5 is cut off, the voltage restriction unit 15 restricts a generated voltage of the motor 5 generated due to rotation of the motor 5 by an external force to a predetermined voltage (hereinafter referred to as a "threshold voltage") $E_z$. The case in which the motor 5 is rotated by an external force is a case in which the motor 5 rotates due to non-motorized movement of the tailgate 2, for example, such as opening and closing of the tailgate 2 by a user. For example, the voltage restriction unit 15 is a Zener diode. When the voltage restriction unit 15 is a Zener diode, an anode of the Zener diode is connected to the ground and a cathode thereof is connected between the switch unit 12 and the inverter 11. When a voltage is applied in a reverse direction, the Zener diode undergoes Zener breakdown at the threshold voltage $E_z$ and thereby a constant voltage can be obtained irrespective of a current value flowing therethrough. Therefore, when a voltage applied between the switch unit 12 and the inverter 11 exceeds the threshold voltage $E_z$, the Zener breakdown occurs in the Zener diode. When the Zener breakdown occurs, the Zener diode causes a current to flow from the cathode toward the anode. In the following description, a case in which the voltage restriction unit 15 is a Zener diode will be described.

The current detection unit 16 is a detection unit that detects a current flowing through the motor 5. For example, the current detection unit 16 detects a potential difference between opposite ends of the shunt resistor 17 provided on a path of the current flowing to the motor 5. On the basis of the potential difference between opposite ends of the shunt resistor, the current detection unit 16 detects a current value flowing through the motor 5 (hereinafter referred to as a motor current) that actually flows through the motor 5. The current detection unit 16 outputs the detected motor current to the control unit 19.

Specifically, in the case of the motorized mode, the opening-closing body control device 4 detects a current flowing from the power supply device 7 via the switch unit 12 to the motor 5 as the motor current. On the other hand, in the case of the manual mode, when the generated voltage of the motor 5 is restricted to the threshold voltage $E_z$ by the voltage restriction unit 15, the opening-closing body control device 4 detects a generated current output from the motor 5 as the motor current. Specifically, in the case of the manual mode, since the Zener breakdown occurs in the voltage restriction unit 15, the opening-closing body control device 4 detects the generated current flowing from the cathode to the anode as the motor current. Further, the current detection unit 16 may detect the motor current on the basis of electromagnetic principles using a Hall element, a current detection coil, or the like.

Figure 3:
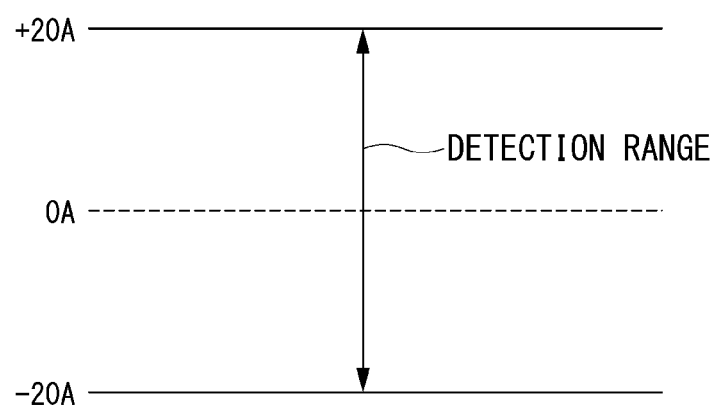
FIG. 3 is a diagram showing a detection range of a motor current by a current detection unit 16 according to the first embodiment.

Further, directions of the motor current detected by the current detection unit 16 in the motorized mode and the manual mode are opposite to each other. Therefore, since a detection range of the motor current by the current detection unit 16 is set so that a positive motor current and a negative motor current are detectable as shown in FIG. 3, a current in a reverse direction can also be detected.

The rotation state calculation unit 18 calculates a rotation state of the motor 5 on the basis of a detection signal supplied from the rotation sensor 6. In the first embodiment, the rotation state is a rotation number, but the rotation state is not limited thereto, and may be a rotational speed or an angular velocity. The rotation state calculation unit 18 outputs the calculated rotation number to the control unit 19.

When an opening-closing operation signal indicating opening and closing of the tailgate 2 is acquired from the outside, the control unit 19 outputs the conductive state transition signal to the first drive unit 13 to bring the switch unit 12 into a conductive state. Then, the control unit 19 controls the inverter 11 by pulse width modulation (PWM) control by outputting a first drive signal for an opening operation or a closing operation of the tailgate 2 to the inverter 11. For example, in a case of rotating the motor 5 in a forward direction, the control unit 19 performs PWM control of the inverter 11 to bring each of the switching element 111 and the switching element 114 into a conductive state so that the motor 5 is rotated in the forward direction to open the tailgate 2. Also, in a case of rotating the motor 5 in a reverse direction, the control unit 19 performs PWM control of the inverter 11 to bring each of the switching element 112 and the switching element 113 into a conductive state so that the motor 5 is rotated in a reverse direction to close the tailgate 2.

On the other hand, when the opening-closing operation signal is not acquired from the outside, the control unit 19 outputs the cut-off state transition signal to the first drive unit 13 so that the switch unit 12 is brought into a cut-off state and the first drive signal and the second drive signal are not output. That is, the control unit 19 does not perform the PWM control of the inverter 11.

Also, when the switch unit 12 is in a cut-off state, the control unit 19 controls the switch unit 12 to be in a conductive state in response to detection of the generated current by the current detection unit 16, and thereby the power supply device 7 and the motor 5 are electrically connected. For example, in a state in which the switch unit 12 is in a cut-off state, when a generated current is detected, the control unit 19 controls the switch unit 12 to be in a conductive state. Thereby, the control unit 19 suppresses the generated voltage of the motor 5 (a voltage between a connection point of the switch unit 12 and the inverter 11, and the ground) not to be equal to or higher than a power supply voltage $E_{Batt}$ of the power supply device 7. Further, the power supply voltage $E_{Batt}$ is a lower value than the threshold voltage $E_z$. Therefore, for example, when a generated voltage exceeding the threshold voltage $E_z$ is generated due to rotation of the motor 5 by an external force, the generated voltage is suppressed to be equal to or lower than the threshold voltage $E_z$ and reaches the power supply voltage $E_{Batt}$ after a predetermined time. For example, the predetermined time is a time from detection of the generated current by the current detection unit 16 until the switch unit 12 is brought into a conductive state. In this case, when the switch unit 12 is in a conductive state, since the generated voltage reaches the power supply voltage $E_{Batt}$, the Zener breakdown due to the voltage restriction unit 15 is stopped. That is, since the Zener breakdown occurs in the voltage restriction unit 15, a time during which the generated current flows from the cathode to the anode is restricted to the above-described predetermined time. Thereby, since power consumption consumed in the voltage restriction unit 15 can be reduced, the voltage restriction unit 15 with a lower capacitance value can be used. Therefore, the costs of parts can be reduced.

When the rotation number of the motor 5 is lower than a predetermined rotation number, the control unit 19 controls the switch unit 12 to be in a cut-off state so that the electrical connection between the power supply device 7 and the motor 5 is cut off. Specifically, in a case in which the switch unit 12 is controlled to be in a conductive state in response to the detection of the generated current, when the rotation number of the motor 5 calculated by the rotation state calculation unit 18 is lower than the predetermined rotation number, the control unit 19 outputs the cut-off state transition signal to the first drive unit 13 to control the switch unit 12 to be in a cut-off state. In this way, the control unit 19 detects that the generated voltage has reached a voltage low enough not to affect internal parts of the opening-closing body control device 4 on the basis of the rotation speed of the motor 5 and returns the switch unit 12 to a normal state (cut-off state) in the manual mode.

Figure 4:
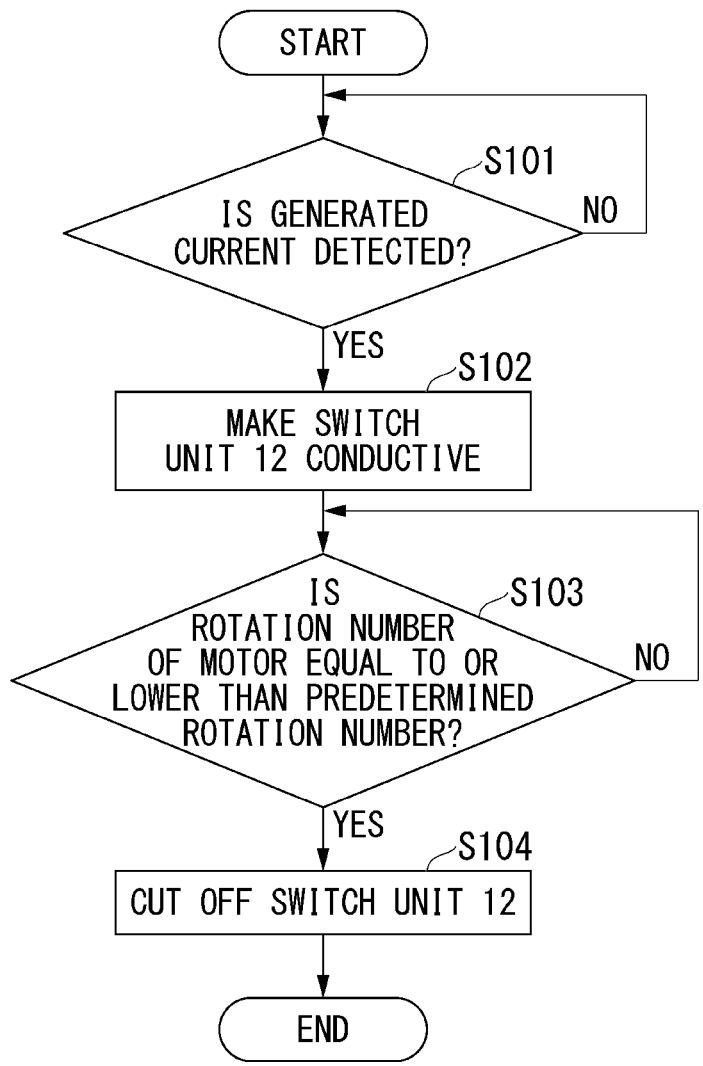
FIG. 4 is a diagram showing a flow of processing of the opening-closing body control device 4 according to the first embodiment.
Figure 5:
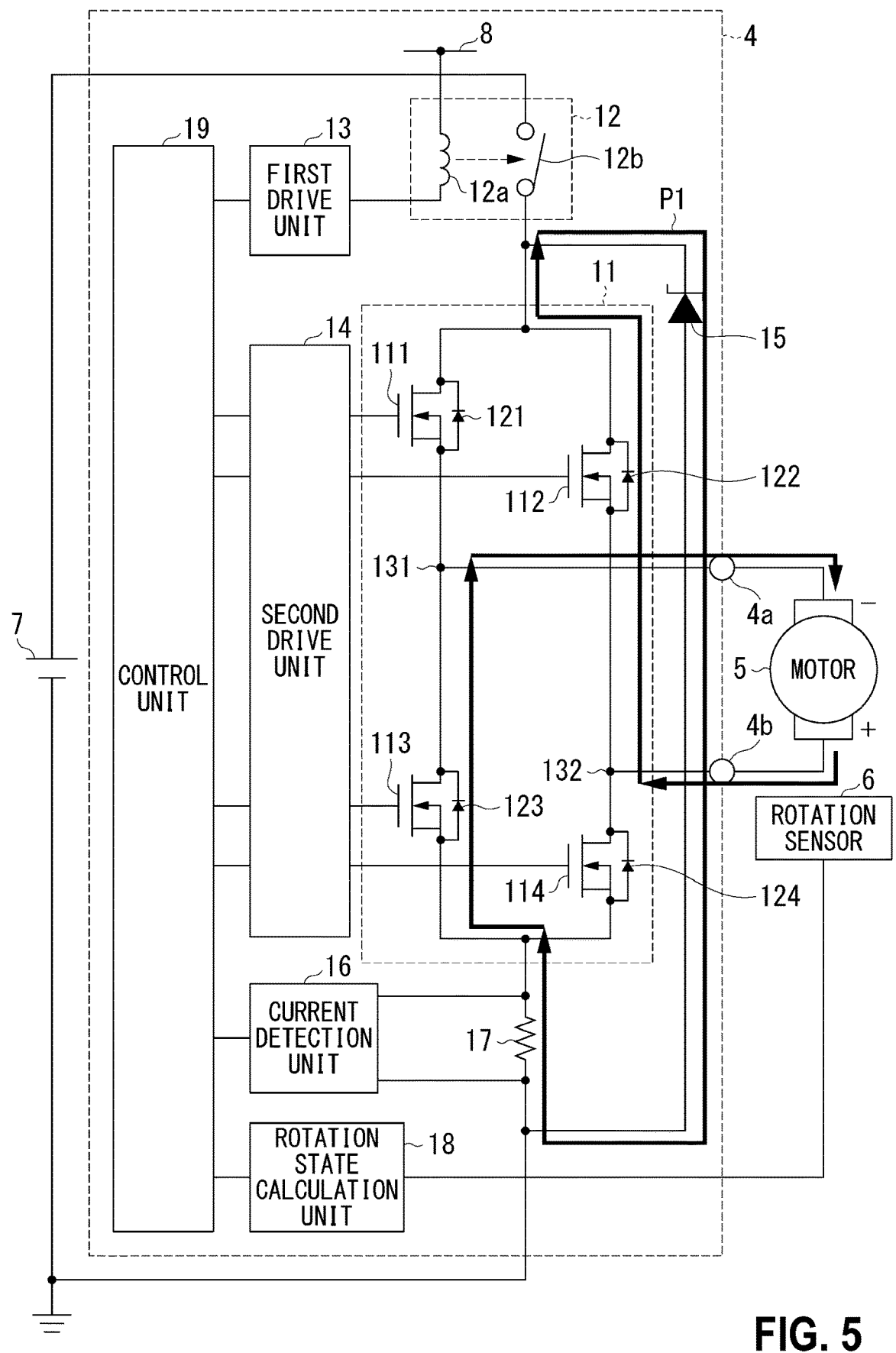
FIG. 5 is a diagram illustrating a flow of a generated current when Zener breakdown has occurred in a voltage restriction unit 15 in a manual mode according to the first embodiment.
Figure 6:
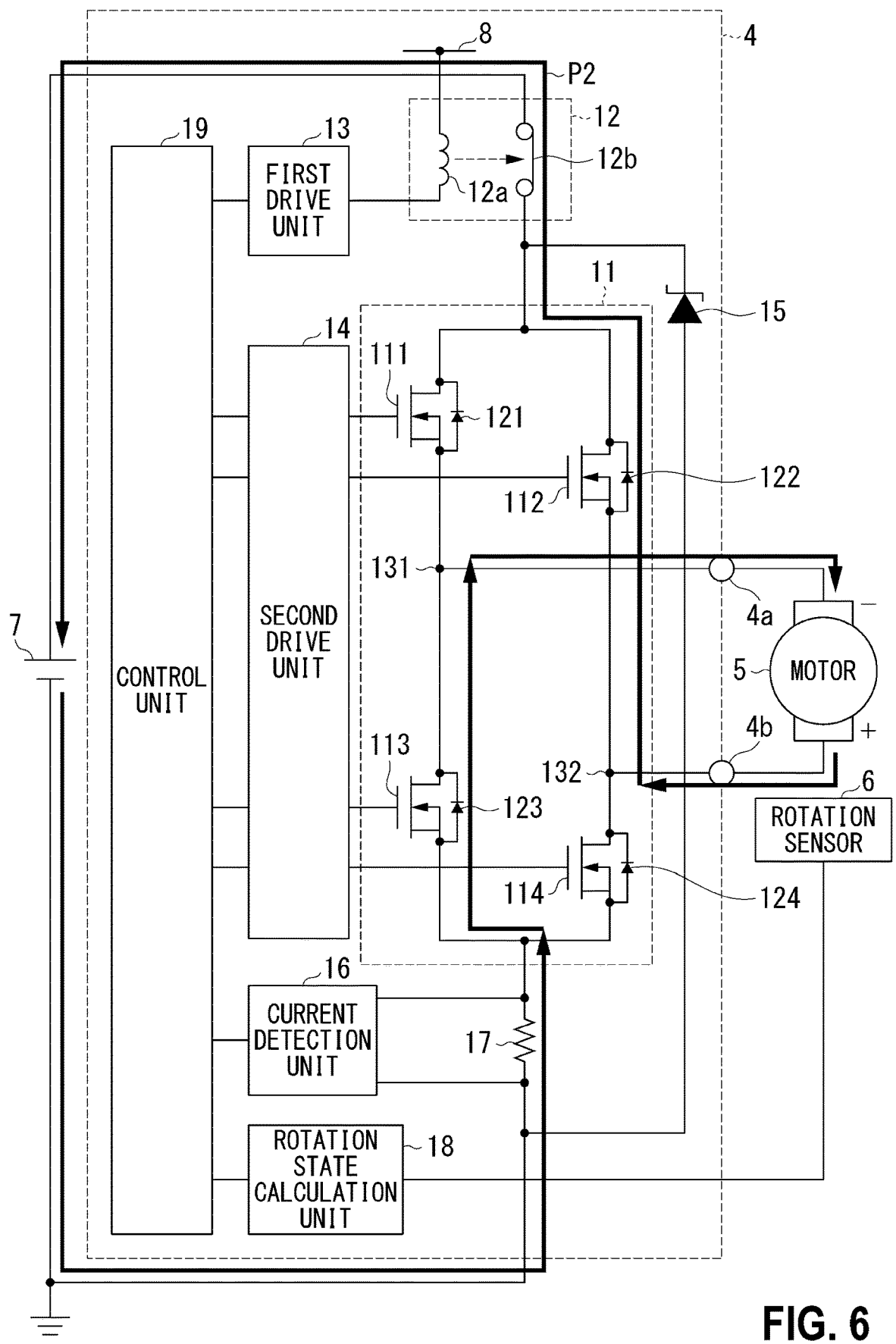
FIG. 6 is a diagram illustrating a flow of a generated current when a switch 12b is in an ON state in a case of the manual mode according to the first embodiment.

Hereinafter, processing of the manual mode of the opening-closing body control device 4 according to the first embodiment will be described with reference to FIGS. 4 to 6. FIG. 4 is a diagram showing a flow of processing of the opening-closing body control device 4 according to the first embodiment. FIG. 5 is a diagram illustrating a flow of a generated current in a case in which Zener breakdown has occurred in the voltage restriction unit 15 according to the first embodiment. FIG. 6 is a diagram illustrating a flow of a generated current in the case of the manual mode according to the first embodiment.

When the tailgate 2 stops during an automatic operation, the control unit 19 outputs the cut-off state transition signal to the first drive unit 13 to bring the switch unit 12 into a cut-off state. Thereafter, when the tailgate 2 is manually operated by a user, a generated voltage due to the motor 5 is generated. Since the inverter 11 is connected to opposite ends of the motor 5, the generated voltage is applied to the inverter 11.

When the generated voltage is equal to or higher than the threshold voltage $E_z$, the voltage restriction unit 15 (Zener diode in the first embodiment) restricts the generated voltage applied to the inverter 11 to the threshold voltage $E_z$. In this case, since the Zener breakdown has occurred in the voltage restriction unit 15, the generated current flows from the cathode to the anode. Therefore, as illustrated in FIG. 5, the generated current output from the other end of the motor 5 passes through a path P1 that passes through the freewheeling diode 122, the voltage restriction unit 15, the shunt resistor 17, and the freewheeling diode 123 in order, and returns to one end of the motor 5.

As shown in FIG. 4, the control unit 19 determines whether or not a generated current is detected by the current detection unit 16 (step S101). When the generated current passing through the path P1 is detected by the current detection unit 16, the control unit 19 outputs the conductive state transition signal to the first drive unit 13 to bring the switch unit 12 into the conductive state (step S102). Thereby, as illustrated in FIG. 6, the generated current output from the other end of the motor 5 passes through a path P2 that passes through the freewheeling diode 122, the switch unit 12, the power supply device 7, the shunt resistor 17, and the freewheeling diode 123 in order, and returns to one end of the motor 5. Therefore, a generated voltage applied to the inverter 11 is restricted to the power supply voltage $E_{Batt}$ or lower.

Referring to FIG. 4 again, the control unit 19 determines whether or not the rotation number of the motor 5 is equal to or lower than a predetermined rotation number (step S103). When the rotation number of the motor 5 is determined to be equal to or lower than the predetermined rotation number, the control unit 19 outputs the cut-off state transition signal to the first drive unit 13 to bring the switch unit 12 into the cut-off state (step S104).

As described above, when the connection between the power supply device 7 and the motor 5 is cut off, the opening-closing body control device 4 according to the first embodiment restricts the generated voltage of the motor 5 generated due to rotation of the motor 5 by an external force to a predetermined voltage (threshold voltage $E_z$). Also, when the generated voltage is restricted to the predetermined voltage (threshold voltage $E_z$) the opening-closing body control device 4 controls the switch unit 12 to be in a conductive state in response to the detection of the generated current output from the motor 5. As a result, even when a time delay occurs from the detection of the non-motorized movement of the tailgate 2 until the switch unit 12 is brought into a conductive state, the opening-closing body control device 4 can suppress an overvoltage generated due to the non-motorized movement of the tailgate 2.

Figure 7:
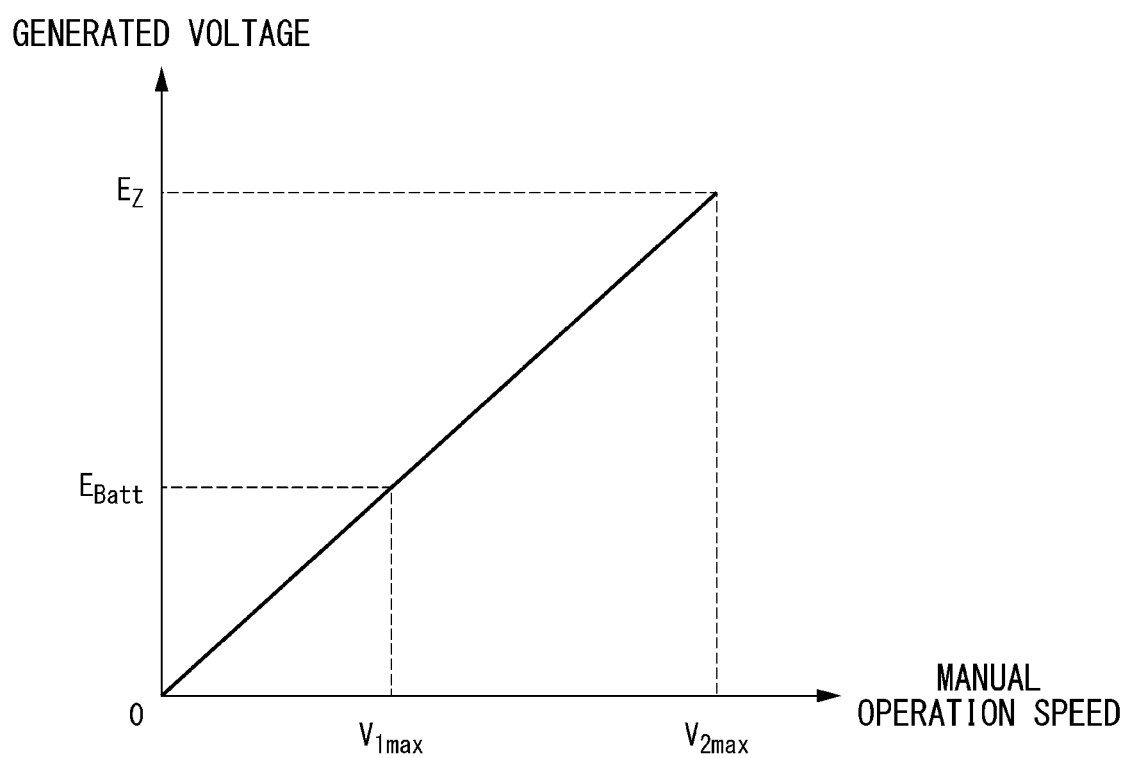
FIG. 7 is a diagram showing an effect of control with respect to a switch unit 12 by the opening-closing body control device 4 according to the first embodiment.

Also, in a conventional method in which a generated voltage is restricted by causing the switch unit 12 to be in a conductive state with no voltage restriction unit 15 provided therein, a manual operation load of the power supply device 7 becomes heavy for generated power equal to or higher than the power supply voltage $E_{Batt}$ due to the switch unit 12 placed in a conductive state. Therefore, in the conventional method, there is a possibility that even a manual operation (manual operation with a manual operation speed from $V_{1max}$ to $V_{2max}$ shown in FIG. 7) in which the manual operation speed is not high is suppressed. The opening-closing body control device 4 of the first embodiment restricts the generated voltage at the threshold voltage $E_z$ which is higher than the power supply voltage $E_{Batt}$ and thereafter brings the switch unit 12 into a conductive state when a generated current is detected. Thereby, as shown in FIG. 7, in the opening-closing body control device 4, since a range in which the manual operation load does not become heavy can be set to be wide compared to the conventional method, the manual operation in which a manual operation speed is not high (manual operation with the manual operation speed from $V_{1max}$ to $V_{2max}$ shown in FIG. 7) can be prevented from being suppressed. Further, when the generated current is detected, the opening-closing body control device 4 controls the switch unit 12 to be in a conductive state to stop the Zener breakdown so that the generated current does not flow through the voltage restriction unit 15. As a result, since power consumption of the voltage restriction unit 15 can be reduced, the voltage restriction unit 15 with a lower capacitance value can be used.

Figure 8:
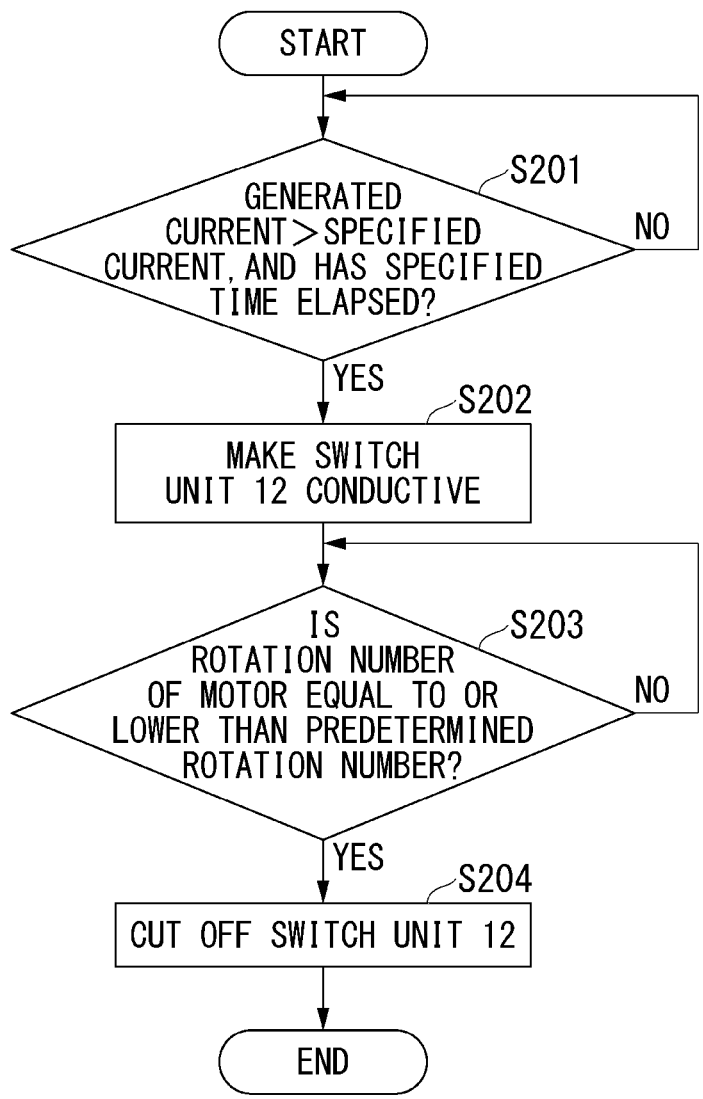
FIG. 8 is a diagram showing a first modified example in processing of the opening-closing body control device 4 according to the first embodiment.

Also, in the above-described embodiment, although an example in which the control unit 19 controls the switch unit 12 to be in a conductive state when the generated current is detected in a case in which the switch unit 12 is in a cut-off state has been described, the present invention is not limited thereto. For example, as shown in FIG. 8, in a case in which the switch unit 12 is in a cut-off state, the control unit 19 may determine whether or not a generated current equal to or higher than a predetermined current value (specified current) continues to be detected for a predetermined period of time (specified time) (step S201) and may control the switch unit 12 to be in a conductive state when the generated current equal to or higher than the specified current continues to be detected for the specified period of time (step S202). Further, the specified current and the specified time may be, for example, those set in advance and may be set according to power consumption or a temperature characteristic of the voltage restriction unit 15. In this way, when a generated current equal to or higher than the specified current continues to be detected for the specified period of time, the control unit 19 controls the switch unit 12 to be in a conductive state to prevent the generated current from flowing through the voltage restriction unit 15. As a result, the control unit 19 can suppress an overvoltage generated due to the non-motorized movement of the tailgate 2 to be equal to or lower than the power supply voltage $E_{Batt}$ and prevent a temperature of the voltage restriction unit 15 from rising and undergoing a thermal runaway due to the generated current equal to or higher than the specified value flowing through the voltage restriction unit 15 for a long period of time.

Figure 9:
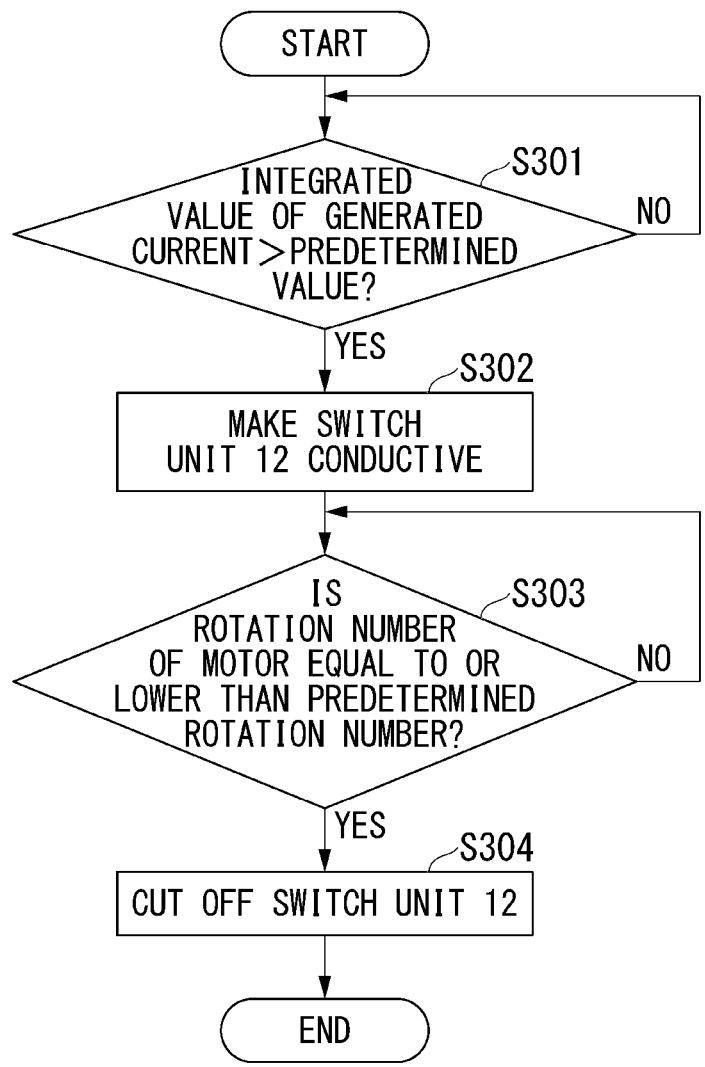
FIG. 9 is a diagram showing a second modified example in processing of the opening-closing body control device 4 according to the first embodiment.

Also, in the above-described embodiment, although an example in which the control unit 19 controls the switch unit 12 to be in a conductive state when the generated current is detected in a case in which the switch unit 12 is in a cut-off state has been described, the present invention is not limited thereto. For example, as shown in FIG. 9, in a case in which the switch unit 12 is in a cut-off state, the control unit 19 determines whether or not an integrated value of the generated current detected by the current detection unit 16 is equal to or higher than a predetermined value after the generated voltage is restricted to the predetermined voltage (threshold voltage $E_z$) by the voltage restriction unit 15 (step S301). Then, when the integrated value is determined to be equal to or higher than the predetermined value, the control unit 19 may control the switch unit 12 to be in a conductive state (step S302). Further, this predetermined value, for example, may be set in advance and may be set according to power consumption or a temperature characteristic of the voltage restriction unit 15. In this way, when the integrated value of the generated current is equal to or higher than the predetermined value, the control unit 19 controls the switch unit 12 to be in a conductive state to prevent the generated current from flowing through the voltage restriction unit 15. Thereby, the control unit 19 can suppress the overvoltage generated due to the non-motorized movement of the tailgate 2 to be equal to or lower than the power supply voltage $E_{Batt}$ and prevent a temperature of the voltage restriction unit 15 from rising and undergoing a thermal runaway due to the generated current equal to or higher than the predetermined value flowing through the voltage restriction unit 15.

Second Embodiment

Figure 10:
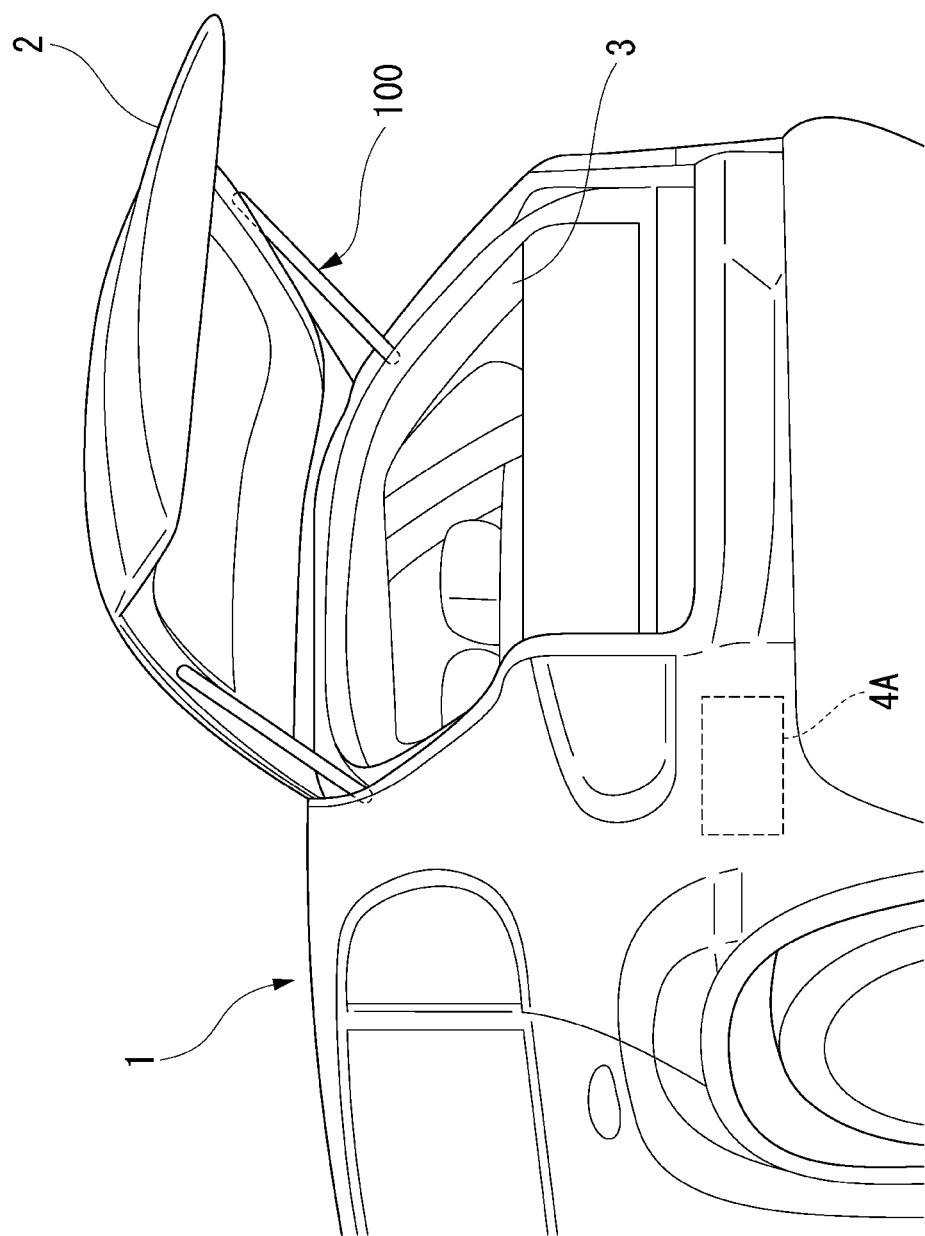
FIG. 10 is a perspective view illustrating an example of a vehicle 1 in which an opening-closing body control device 4A according to a second embodiment is mounted.
Figure 11:
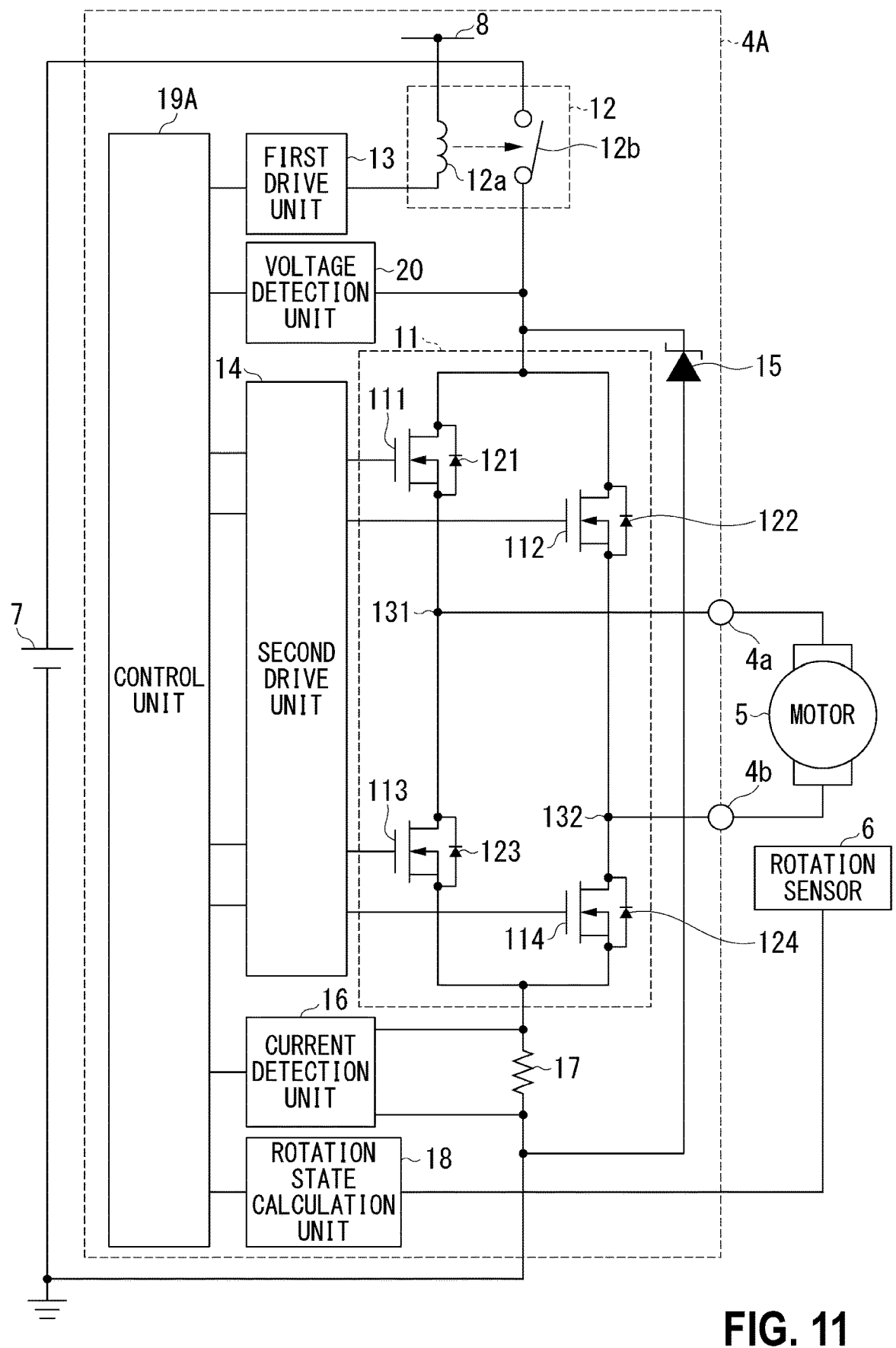
FIG. 11 is a diagram illustrating an example of a schematic configuration of the opening-closing body control device 4A according to the second embodiment.

FIG. 10 is a perspective view illustrating an example of a vehicle 1 on which an opening-closing body control device 4A according to a second embodiment is mounted. FIG. 11 is a diagram illustrating an example of a schematic configuration of the opening-closing body control device 4A according to the second embodiment.

Compared to the first embodiment, a configuration of the opening-closing body control device 4A according to the second embodiment is different in that the device includes a voltage detection unit.

Hereinafter, the opening-closing body control device 4A according to the second embodiment will be described in detail.

As illustrated in FIG. 11, the opening-closing body control device 4A includes an inverter 11, a switch unit 12, a first drive unit 13, a second drive unit 14, a voltage restriction unit 15, a current detection unit 16, a shunt resistor 17, a rotation state calculation unit 18, a voltage detection unit 20, and a control unit 19A.

The voltage detection unit 20 is a detection unit detecting a voltage between the other end of a switch 12b and a cathode of the voltage restriction unit 15 (Zener diode), that is, detecting a generated voltage. The voltage detection unit 20 outputs the detected voltage to the control unit 19.

The control unit 19A has the same function as the control unit 19 according to the first embodiment.

Further, when the switch unit 12 is in a cut-off state, the control unit 19 electrically connects a power supply device 7 to a motor 5 by controlling the switch unit 12 to be in a conductive state according to a voltage value detected by the voltage detection unit 20.

For example, in a case in which the switch unit 12 is in a cut-off state, the control unit 19A controls the switch unit 12 to be in a conductive state when the generated voltage detected by the voltage detection unit 20 is equal to or higher than a predetermined specified voltage. This specified voltage is a voltage corresponding to a threshold voltage $E_z$. Thereby, the control unit 19 suppresses the generated voltage of the motor 5 not to be equal to or higher than a power supply voltage $E_{Batt}$ of the power supply device 7. Further, the power supply voltage $E_{Batt}$ is a value lower than the threshold voltage $E_z$. Therefore, for example, when a generated voltage exceeding the threshold voltage $E_z$ is generated due to rotation of the motor 5 by an external force, the generated voltage is suppressed to be equal to or lower than the threshold voltage $E_z$ and reaches the power supply voltage $E_{Batt}$ after a predetermined time. For example, the predetermined time is a time from detection of the generated voltage by the voltage detection unit 20 until the switch unit 12 is brought into the conductive state. In this case, when the switch unit 12 is in a conductive state, since the generated voltage reaches the power supply voltage $E_{Batt}$, Zener breakdown due to the voltage restriction unit 15 is stopped. That is, since the Zener breakdown occurs in the voltage restriction unit 15, a time during which the generated current flows from a cathode to an anode is restricted to the above-described predetermined time. Thereby, since power consumption consumed in the voltage restriction unit 15 can be reduced, the voltage restriction unit 15 with a lower capacitance value can be used. Therefore, the costs of parts can be reduced.

When rotation number of the motor 5 is lower than a predetermined rotation number, the control unit 19 controls the switch unit 12 to be in a cut-off state to cut off the electrical connection between the power supply device 7 and the motor 5. Specifically, in a case in which the switch unit 12 is controlled to be in a conductive state, when the rotation number of the motor 5 calculated by the rotation state calculation unit 18 is lower than the predetermined rotation number, the control unit 19 outputs a cut-off state transition signal to the first drive unit 13 to control the switch unit 12 to be in a cut-off state. In this way, the control unit 19 detects that the generated voltage has reached a voltage low enough not to affect internal parts of the opening-closing body control device 4 on the basis of the rotation number of the motor 5 and returns the switch unit 12 to a normal state (cut-off state) in the manual mode.

Figure 12:
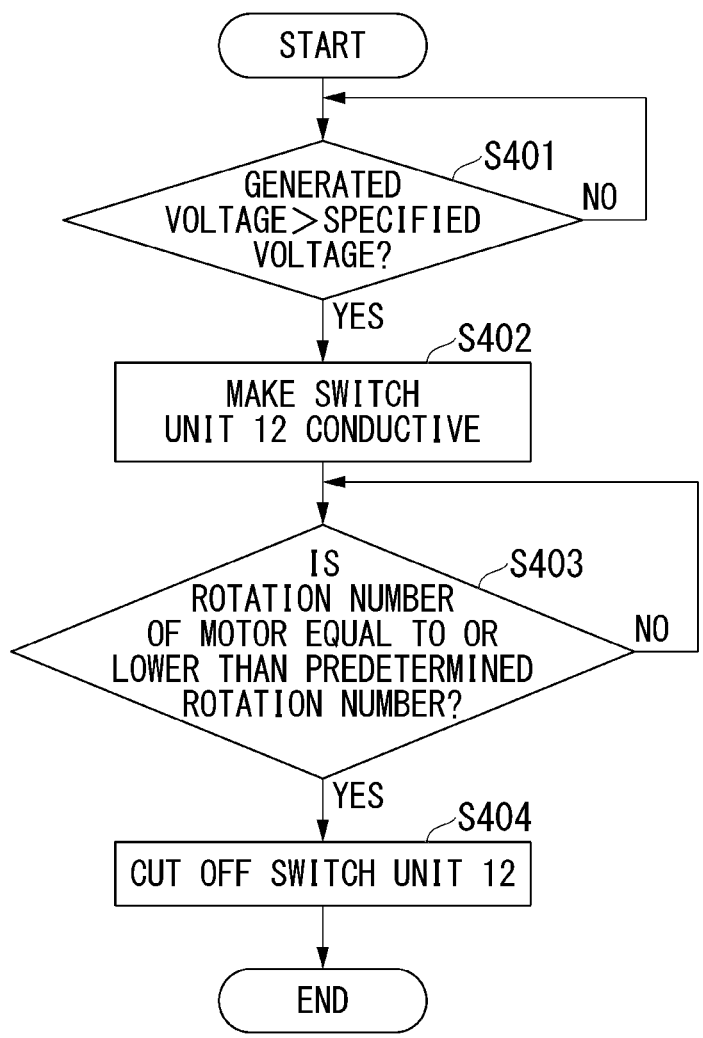
FIG. 12 is a diagram showing a second modified example in processing of the opening-closing body control device 4 according to the second embodiment.
Figure 13:
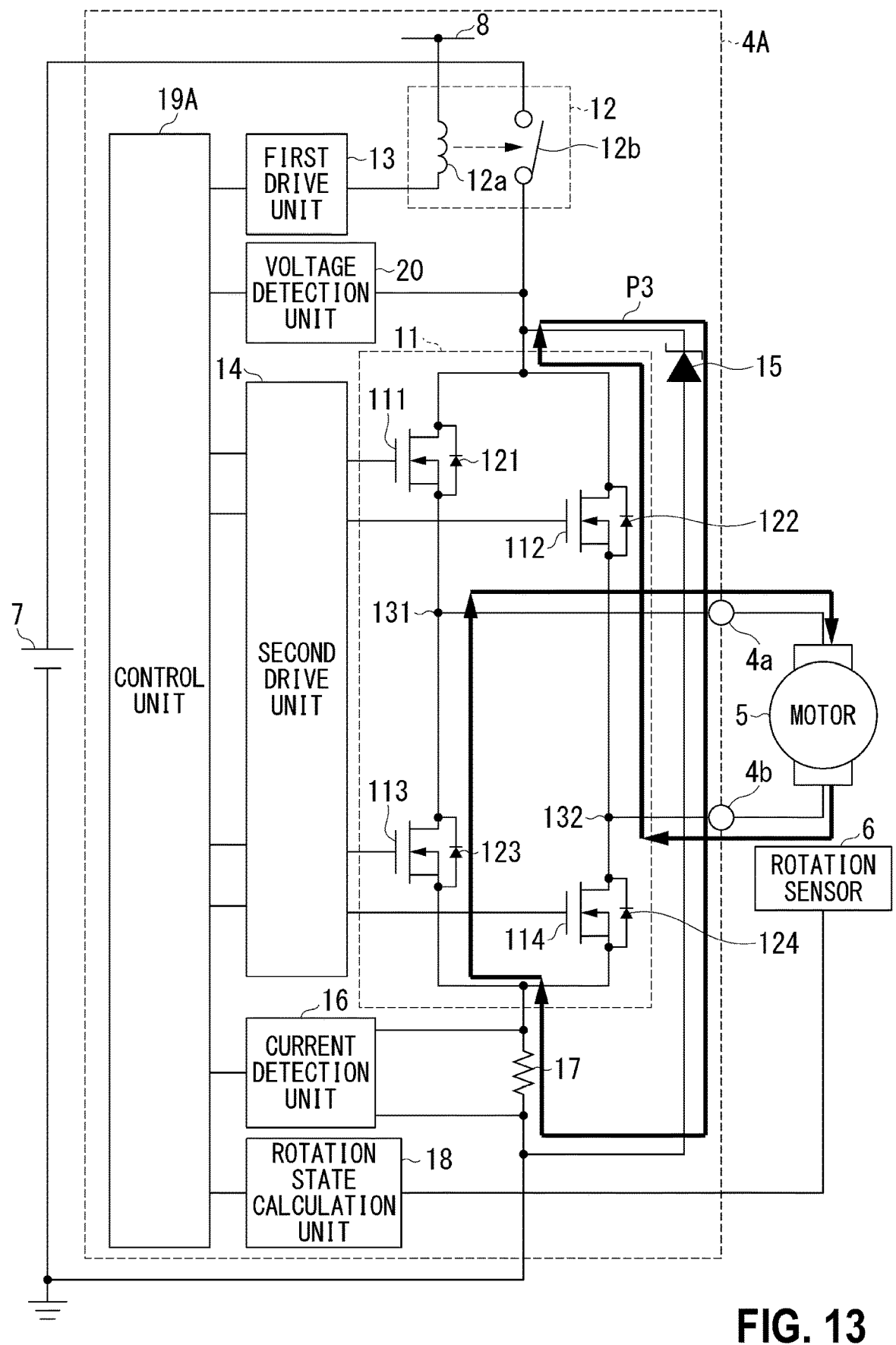
FIG. 13 is a diagram illustrating a flow of a generated current when Zener breakdown has occurred in a voltage restriction unit 15 in a manual mode of the opening-closing body control device 4 according to the second embodiment.
Figure 14:
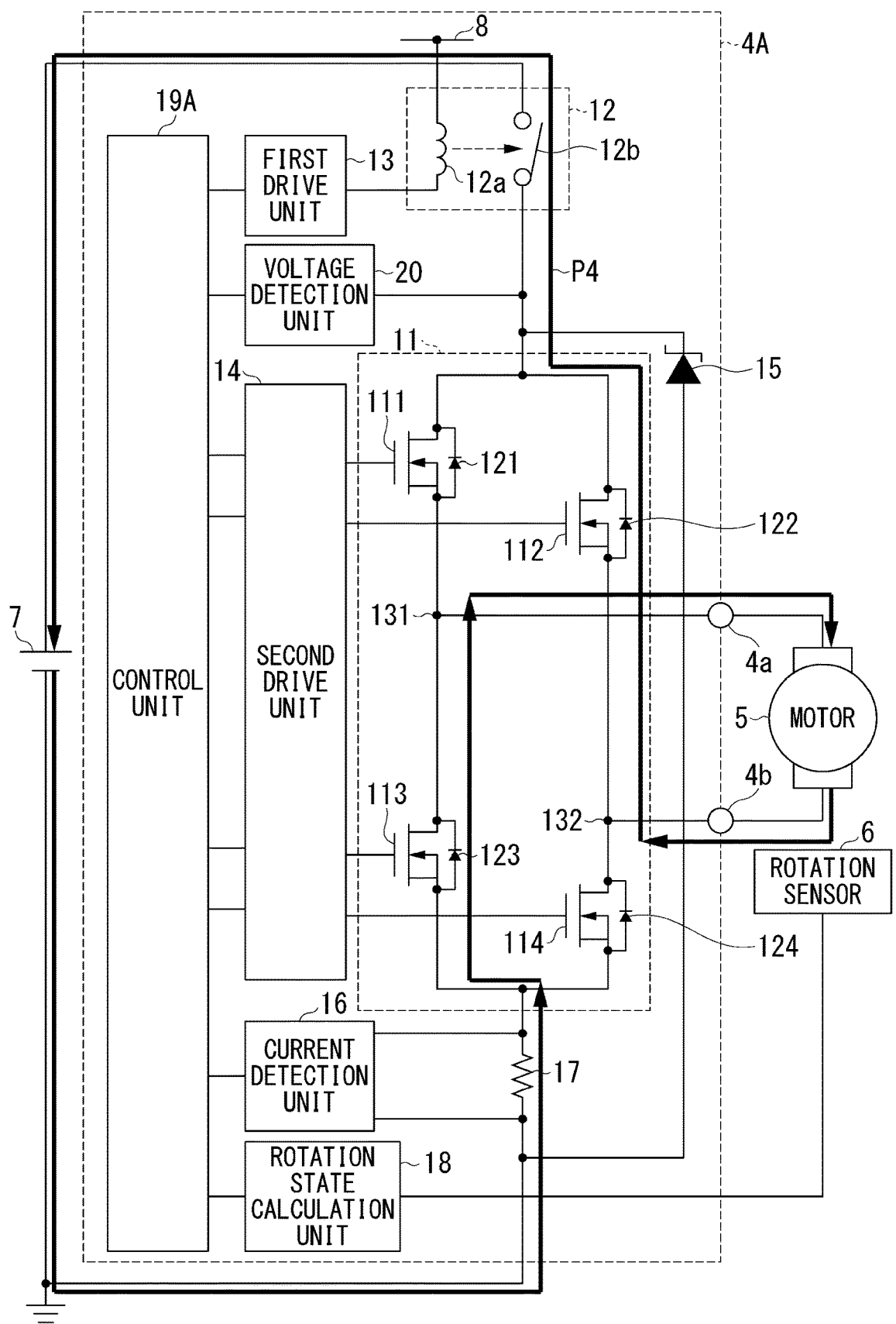
FIG. 14 is a diagram illustrating a flow of a generated current when a switch 12 is in an ON state in a case of the manual mode according to the second embodiment.

Hereinafter, processing of the manual mode of the opening-closing body control device 4A according to the second embodiment will be described with reference to FIGS. 12 to 14. FIG. 12 is a diagram showing a flow of processing of the opening-closing body control device 4A according to the second embodiment. FIG. 13 is a diagram illustrating a flow of a generated current when Zener breakdown has occurred in the voltage restriction unit 15 according to the second embodiment. FIG. 14 is a diagram illustrating a flow of a generated current when the switch 12b is in an ON state in a case of the manual mode according to the second embodiment.

When the tailgate 2 stops during an automatic operation, the control unit 19A outputs the cut-off state transition signal to the first drive unit 13 to bring the switch unit 12 into a cut-off state. Thereafter, when the tailgate 2 is manually operated by a user, a generated voltage due to the motor 5 is generated. Since the inverter 11 is connected to opposite ends of the motor 5, the generated voltage is applied to the inverter 11.

When the generated voltage is equal to or higher than the threshold voltage $E_z$, the voltage restriction unit 15 (Zener diode in the second embodiment) restricts the generated voltage applied to the inverter 11 to the threshold voltage $E_z$. In this case, since the Zener breakdown has occurred in the voltage restriction unit 15, the generated current flows from the cathode to the anode. Therefore, as illustrated in FIG. 13, the generated current output from the other end of the motor 5 passes through a path P3 that passes through a freewheeling diode 122, the voltage restriction unit 15, the shunt resistor 17, and a freewheeling diode 123 in order, and returns to one end of the motor 5.

As shown in FIG. 12, the control unit 19A determines whether or not the generated voltage detected by the voltage detection unit 20 is equal to or higher than a specified voltage (step S401).

When the generated voltage detected by the voltage detection unit 20 is equal to or higher than the specified voltage, the control unit 19A outputs a conductive state transition signal to the first drive unit 13 to bring the switch unit 12 into a conductive state (step S402). Thereby, as illustrated in FIG. 14, the generated current output from the other end of the motor 5 passes through a path P4 that passes through the freewheeling diode 122, the switch unit 12, the power supply device 7, the shunt resistor 17, and the freewheeling diode 123 in order, and returns to one end of the motor 5. Therefore, the generated voltage applied to the inverter 11 is restricted to the power supply voltage $E_{Batt}$ or lower.

Referring to FIG. 12 again, the control unit 19A determines whether or not the rotation number of the motor 5 is equal to or lower than the predetermined rotation number (step S403). When the rotation number of the motor 5 is determined to be equal to or lower than the predetermined rotation number, the control unit 19A outputs the cut-off state transition signal to the first drive unit 13 to bring the switch unit 12 into a cut-off state (step S404).

As described above, when the connection between the power supply device 7 and the motor 5 is cut off, the opening-closing body control device 4A according to the second embodiment restricts the generated voltage of the motor 5 generated due to rotation of the motor 5 by an external force to the predetermined voltage (threshold voltage $E_z$). Also, when the generated voltage is restricted to the predetermined voltage (threshold voltage $E_z$) the opening-closing body control device 4A controls the switch unit 12 to be in a conductive state in response to the detection of the generated voltage output from the motor 5. As a result, even when a time delay occurs from detection of non-motorized movement of the tailgate 2 until the switch unit 12 is brought into the conductive state, it is possible to suppress an overvoltage generated due to the non-motorized movement of the tailgate 2.

Further, in a case in which the current detection unit 16 cannot be provided due to specifications or a direction in which the generated current flows cannot be detected by the current detection unit 16, the opening-closing body control device 4A according to the second embodiment can control the switch unit 12 to be in a conductive state according to a detection result of the voltage detection unit 20.

Further, in the second embodiment described above, an example in which the control unit 19A controls the switch unit 12 to be in a conductive state when the generated voltage is equal to or higher than the specified voltage has been described, but the present invention is not limited thereto. For example, in a case in which the switch unit 12 is in a cut-off state, the control unit 19A may control the switch unit 12 to be in a conductive state when a time during which the generated voltage equal to or higher than the specified voltage continues for a predetermined time (specified time) in step S401. In this case, in step S401, the control unit 19A determines whether or not the time during which the generated voltage equal to or higher than the specified voltage continues for a predetermined time (specified time). Thereby, the control unit 19A can suppress an overvoltage generated due to the non-motorized movement of the tailgate 2 to be equal to or lower than the power supply voltage $E_{Batt}$ and prevent a temperature of the voltage restriction unit 15 from rising and undergoing a thermal runaway due to the generated current equal to or higher than the specified current flowing through the voltage restriction unit 15 for a long period of time.

Further, in the second embodiment described above, when the current detection unit 16 is not required, the current detection unit 16 may be omitted from the configuration of the opening-closing body control device 4A. In that case, a function related to the detection result of the current detection unit 16 may be omitted in the control unit 19A.

Next, a modified example of the opening-closing body control device 4 according to the first embodiment will be described. However, the modified example described below can also be applied to the opening-closing body control device 4A according to the second embodiment.

The modified example described below is a modified example of an operation of the opening-closing body control device 4A in a case in which rotation number of the motor 5 is determined to be not equal to or lower than the predetermined rotation number in step S103.

MODIFIED EXAMPLE 1

When the rotation number of the motor 5 is determined to be not equal to or lower than the predetermined rotation number in step S103, the control unit 19 determines whether or not a direction in which the generated current flows (a direction of the generated current) is positive or negative on the basis of a rotation direction of the motor 5. Then, from the determined direction of the generated current, the control unit 19 selects two switching elements through which the generated current flows among the switching elements 111 to 114. Then, the control unit 19 controls the two selected switching elements to be in an ON state. For example, in FIG. 5, when the rotation number of the motor 5 is determined to be not equal to or lower than the predetermined rotation number, the control unit 19 controls the switching element 112 and the switching element 113 to be in the ON state.

Thereby, when the switch unit 12 is in the conductive state, the control unit 19 can suppress failure caused by heat generation of the freewheeling diodes 122 and 123 due to the generated current flowing through the path P1.

In a case in which the control unit 19 controls the two selected switching elements to be always in the ON state, when the rotation number of the motor 5 is determined to be equal to or lower than the predetermined rotation number, the control unit 19 outputs the cut-off state transition signal to the first drive unit 13 to bring the switch unit 12 into a cut-off state (step S104). Then, the control unit 19 stops the control of causing the two selected switching elements to be always in the ON state.

Further, in the first modified example, the control unit 19 may not control the two selected switching elements to always be in the ON state. For example, the control unit 19 may control the two selected switching elements to alternately be in the ON state. Thereby, the control unit 19 can reliably prevent the motor 5 from being driven even when a timing at which the switch unit 12 is brought into a cut-off state is delayed in step S104.

MODIFIED EXAMPLE 2

For example, when rotation number of the motor 5 is determined to be not equal to or lower than the predetermined rotation number in step S103, the control unit 19 controls the switching elements 111 and 112 of an upper arm to be in an ON state in the inverter 11. Thereby, the control unit 19 short-circuits opposite ends of the motor to brake the motor 5. Thereby, the control unit 19 can suppress the generated current due to the motor 5 so that failure due to heat generation of the freewheeling diodes 122 and 123 can be suppressed.

In a case in which the control unit 19 controls the switching elements 111 and 112 of the upper arm to be in the ON state when the rotation number of the motor 5 is determined to be equal to or lower than the predetermined rotation number, the control unit 19 outputs the cut-off state transition signal to the first drive unit 13 to bring the switch unit 12 into a cut-off state (step S104). Then, the control unit 19 stops the control of causing the switching elements 111 and 112 of the upper arm to be in the ON state.

Further, in the first modified example, the control unit 19 may not control the switching elements 111 and 112 of the upper arm to always be in the ON state. For example, the control unit 19 may control the switching elements 111 and 112 of the upper arm to alternately be in the ON state. Thereby, the control unit 19 can smoothly brake the motor 5 compared to a case in which the switching elements 111 and 112 of the upper arm are controlled to always be in the ON state. As a result, it is possible to suppress the brake suddenly becoming heavy.

As described above, the control unit according to the present embodiment electrically connects the power supply device 7 to the motor 5 by controlling the switch unit 12 to be in a conductive state according to the generated power of the motor 5. Thereby, the control unit can suppress an overvoltage generated due to the non-motorized movement of the tailgate 2 to be equal to or lower than the power supply voltage $E_{Batt}$ and prevent a temperature of the voltage restriction unit 15 from rising and undergoing a thermal runaway due to the generated current equal to or higher than a predetermined value flowing through the voltage restriction unit 15. The above-described generated power includes at least one of the generated current and the generated voltage.

The control unit 19 and the control unit 19A in the above-described embodiments may be realized by a computer. In that case, a program for realizing these functions may be recorded on a computer-readable recording medium and realized by causing a computer system to read and execute the program recorded on the recording medium. Further, the "computer system" described herein includes an operating system (OS) and a hardware such as peripherals. Further, the "computer-readable recording medium" refers to a portable medium such as a flexible disk, a magneto-optical disk, a read-only memory (ROM), or a compact disc read-only memory (CD-ROM), and a storage device such as a hard disk built in the computer system. Further, the "computer-readable recording medium" may include one that holds a program dynamically for a short period of time such as a communication line in a case in which programs are transmitted via a network such as the Internet or a communication line such as a telephone line, and one that holds a program for a certain period of time such as volatile memories inside a computer system serving as a server or client in the above-described case. Further, the above-described program may be a program for realizing some of the above-described functions, further may be a program for realizing the above-described functions in combination with programs already recorded on the computer system, and may be realized by using a programmable logic device such as a field-programmable gate array (FPGA).

While embodiments of the present invention have been described in detail above with reference to the accompanying drawings, the specific configurations are not limited to the embodiments but may include design changes without departing from the spirit of the present invention.

INDUSTRIAL APPLICABILITY

According to the above-described opening-closing body control device, an overvoltage generated by non-motorized movement of the opening-closing body can be suppressed.

DESCRIPTION OF THE REFERENCE SYMBOLS

1 Vehicle
2 Tailgate
3 Opening
4 Opening-closing body control device
5 Motor (drive source)
7 Power supply device
11 Inverter
12 Switch unit
13 First drive unit
14 Second drive unit
15 Voltage restriction unit
16 Current detection unit
17 Shunt resistor
18 Rotation state calculation unit
19 Control unit

The invention claimed is:

1. An opening-closing body control device configured to drive an opening-closing body by supplying power from a power supply device to a drive source of the opening-closing body which opens and closes an opening of a vehicle, the opening-closing body control device comprising:
a switch unit provided between the power supply device and the drive source;
a control unit configured to electrically connect or cut off a connection between the power supply device and the drive source by controlling a conductive state or a cut-off state of the switch unit;
a voltage restriction unit configured to restrict a generated voltage of the drive source generated when the drive source is rotated by an external force to a predetermined voltage in a case in which the connection between the power supply device and the drive source is cut off; and
a current detection unit configured to detect a generated current output from the drive source when the generated voltage is restricted to the predetermined voltage, wherein
the control unit electrically connects the power supply device to the drive source by controlling the switch unit to be in the conductive state in response to the generated current being detected, and
the control unit cuts off the connection between the power supply device and the drive source by controlling the switch unit to be in the cut-off state when a rotation number of the drive source is lower than a predetermined rotation number.

2. The opening-closing body control device according to claim 1,
wherein the control unit controls the switch unit to be in the conductive state when the generated current is detected.

3. An opening-closing body control device configured to drive an opening-closing body by supplying power from a power supply device to a drive source of the opening-closing body which opens and closes an opening of a vehicle, the opening-closing body control device comprising:
a switch unit provided between the power supply device and the drive source;
a control unit configured to electrically connect or cut off a connection between the power supply device and the drive source by controlling a conductive state or a cut-off state of the switch unit;
a voltage restriction unit configured to restrict a generated voltage of the drive source generated when the drive source is rotated by an external force to a predetermined voltage in a case in which the connection between the power supply device and the drive source is cut off; and
a current detection unit configured to detect a generated current output from the drive source when the generated voltage is restricted to the predetermined voltage, wherein
the control unit electrically connects the power supply device to the drive source by controlling the switch unit to be in the conductive state in response to the generated current being detected, and
wherein the control unit controls the switch unit to be in the conductive state when the generated current equal to or higher than a predetermined current value continues to be detected for a predetermined period of time.

4. An opening-closing body control device configured to drive an opening-closing body by supplying power from a power supply device to a drive source of the opening-closing body which opens and closes an opening of a vehicle, the opening-closing body control device comprising:
a switch unit provided between the power supply device and the drive source;

a control unit configured to electrically connect or cut off a connection between the power supply device and the drive source by controlling a conductive state or a cut-off state of the switch unit;

a voltage restriction unit configured to restrict a generated voltage of the drive source generated when the drive source is rotated by an external force to a predetermined voltage in a case in which the connection between the power supply device and the drive source is cut off; and a current detection unit configured to detect a generated current output from the drive source when the generated voltage is restricted to the predetermined voltage, wherein the control unit electrically connects the power supply device to the drive source by controlling the switch unit to be in the conductive state in response to the generated current being detected, and wherein the control unit controls the switch unit to be in the conductive state when an integrated value of the generated current detected by the current detection unit is equal to or higher than a predetermined value after the generated voltage is restricted to the predetermined voltage.

5. An opening-closing body control device configured to drive an opening-closing body by supplying power from a power supply device to a drive source of the opening-closing body which opens and closes an opening of a vehicle, the opening-closing body control device comprising:

a switch unit provided between the power supply device and the drive source;

a control unit configured to electrically connect or cut off a connection between the power supply device and the drive source by controlling a conductive state or a cut-off state of the switch unit;

a voltage restriction unit configured to restrict a generated voltage of the drive source generated when the drive source is rotated by an external force to a predetermined voltage in a case in which the connection between the power supply device and the drive source is cut off;

a current detection unit configured to detect a generated current output from the drive source when the generated voltage is restricted to the predetermined voltage;

a plurality of switching elements; and an inverter configured to convert a direct current (DC) voltage supplied from the power supply device into an alternating current (AC) voltage and apply the AC voltage to the drive source, wherein the control unit electrically connects the power supply device to the drive source by controlling the switch unit to be in the conductive state in response to the generated current being detected, and the control unit controls a switching element having a freewheeling diode through which a generated current of the drive source flows among the plurality of switching elements to be in an ON state when a rotation number of the drive source is not lower than a predetermined rotation number after controlling the switch unit to be in the conductive state.

* * * * *